United States Patent
Vaughan et al.

[15] 3,683,696
[45] Aug. 15, 1972

[54] METHODS OF AND APPARATUS FOR MEASURING AND/OR LOCATING TEMPERATURE CONDITIONS

[72] Inventors: Charles L. Vaughan, Van Nuys; William C. Vesser, Los Angeles, both of Calif.

[73] Assignee: Continental Sensing, Inc., Melrose Park, Ill.

[22] Filed: April 15, 1970

[21] Appl. No.: 24,475

Related U.S. Application Data

[63] Continuation of Ser. No. 795,278, Jan. 30, 1969, abandoned.

[52] U.S. Cl. .................73/344, 73/341, 73/359, 338/26, 340/227 C, 340/228 R
[51] Int. Cl. ...............................................G01k 7/02
[58] Field of Search ..........73/341, 344, 359; 338/26; 340/227 C, 228

[56] References Cited

UNITED STATES PATENTS

| | | | |
|---|---|---|---|
| 2,581,213 | 1/1952 | Spooner | 340/228 |
| 2,805,272 | 9/1957 | Postal | 340/228 X |
| 3,408,607 | 10/1968 | Davis | 338/26 |
| 3,493,949 | 2/1970 | Servos et al. | 73/359 X |

OTHER PUBLICATIONS

Peaks Sensing Inc. Bulletin No. 566: Systems that Indicate and Locate Temperature Peaks, Primary Examiner—Louis R. Prince
Assistant Examiner—Frederick Shoon
Attorney—Hume, Clement, Hume & Lee

[57] ABSTRACT

A bridge circuit including a dual balanced energy source and a detector. The circuit is useful, for example, in connection with a method and apparatus for measuring and locating temperature conditions. The apparatus includes a thermoelectric transducer, the dual balanced energy source, a temperature detector and a location detector. The transducer comprises a pair of thermocouple conductors surrounded by thermistor material and encased in a metallic sheath. The sheath may be insulated from the thermistor material, in which case a third conductor will be provided, or the sheath may be uninsulated and serve as the third conductor. The temperature detector is connected to sense the thermoelectric voltage resulting from the junction across the thermistor material at the hottest point along the transducer. The energy source is connected to supply equal and constant currents to the thermocouple conductors to create voltage drops therealong between the point of supply and the hot junction. The location detector is connected to the third conductor and measures the difference between the two voltage drops, which is a function of the location of the hot junction.

14 Claims, 5 Drawing Figures

Patented Aug. 15, 1972
3,683,696
3 Sheets-Sheet 1
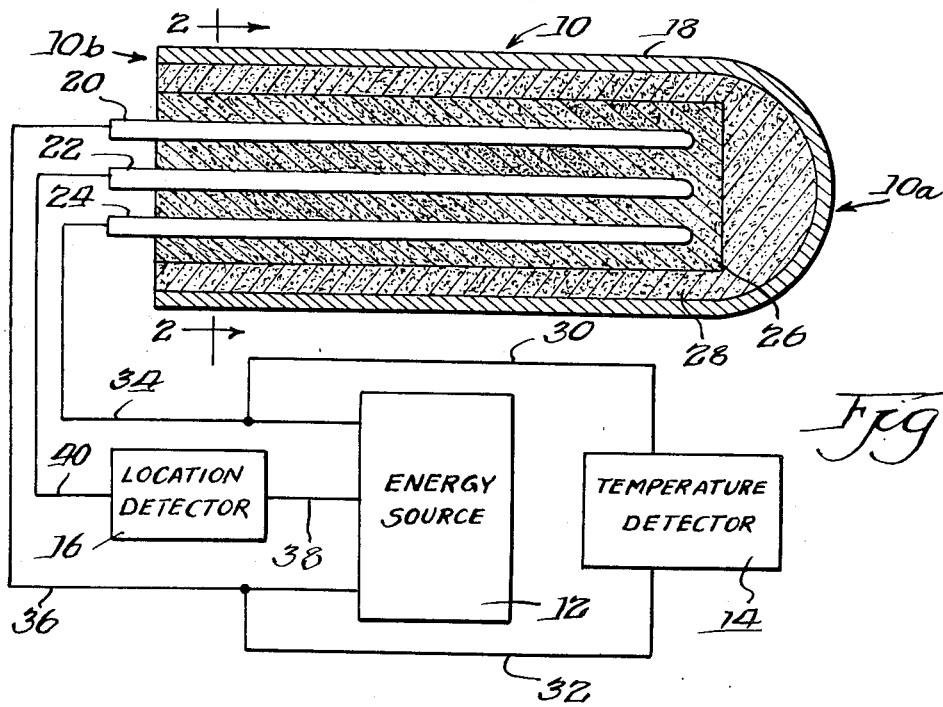
Fig. 1.
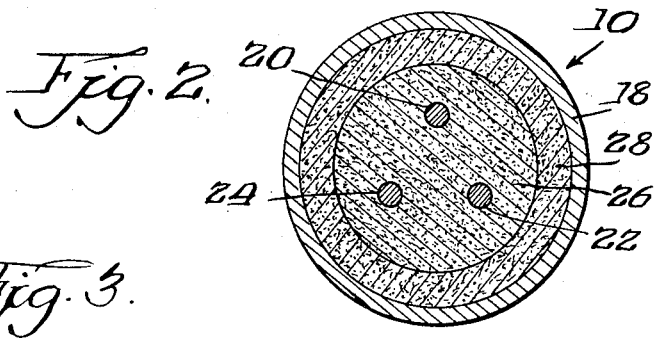
Fig. 2.
Fig. 3.
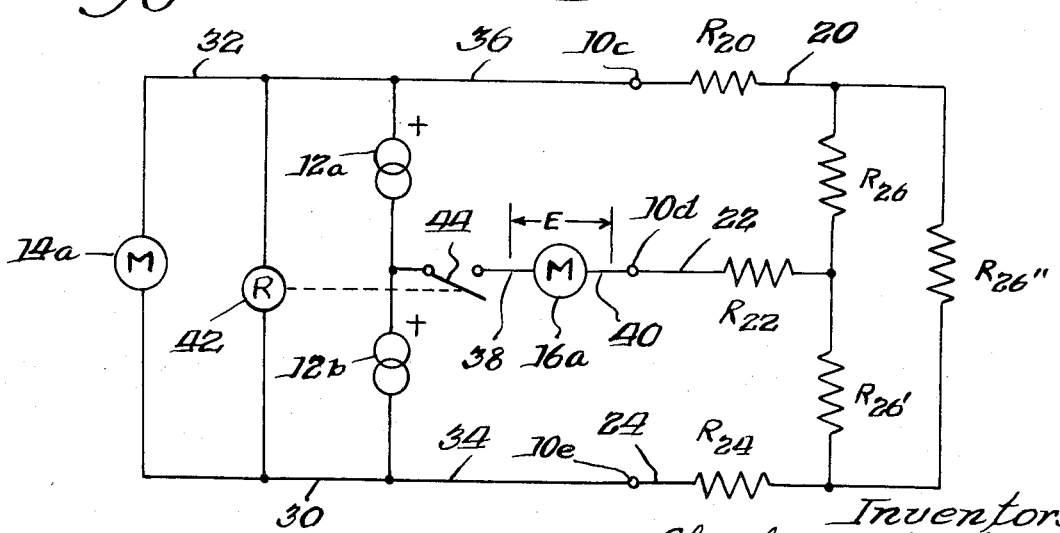
Inventors.
Charles L. Vaughan, &
William C. Vesser.
By Hume, Clement, Hume & Lee Attys

METHODS OF AND APPARATUS FOR MEASURING AND/OR LOCATING TEMPERATURE CONDITIONS

RELATED APPLICATION

This case is a continuation of Ser. No. 795,278, filed Jan. 30, 1969, now abandoned.

BACKGROUND - SUMMARY - DRAWINGS

This invention relates to a novel bridge circuit which finds use in, inter alia, an improved method for measuring and locating temperature conditions of interest within an environment through the use of a system including a thermoelectric transducer. Although the invention will be described in detail in the illustrative context of a temperature measuring and locating system, it should be understood that the bridge circuit which forms a part of the system has numerous other applications.

For example, the novel bridge circuit may be employed in situations where it is desired to gather data or detect responses in connection with complex three-terminal impedances, such as transistors, silicon-controlled rectifiers and switches, unijunction devices, and various diodes and other non-linear two-terminal devices which, with their load elements, may be considered three-terminal networks. In addition, the bridge circuit may be used in a variety of control or monitoring applications; as for example, liquid level detection systems, systems for locating conductor discontinuities, and the like.

In brief, the novel bridge circuit of the present invention comprises means for supplying constant current energy to two terminals of an effective three-terminal impedance, and means for detecting the response of the impedance at its third terminal. The energy supply means preferably includes a balanced pair of constant current sources connected by a common return. Each of the sources is connected to an impedance terminal, and the detector, which may be a direct or alternating current or voltage detector, a frequency or phase detector or a charge detector, is connected between the third impedance terminal and the common interconnection of two constant current sources.

Inasmuch as the current sources are balanced (i.e., they provide equal constant currents), the bridge can be used in a unique manner to detect or measure, simultaneously, two essentially unrelated characteristics. More specifically, the bridge circuit with appropriate detector can be employed to measure what might be called a first-order effect (e.g. a voltage) while simultaneously measuring a second-order effect (e.g. a difference between two voltage drops) unaffected by the first-order effect. An illustrative example of such an application is a system for measuring and locating temperature conditions, described in detail below.

In certain environments, as for example nuclear reactors, jet engines, etc., it is often essential to provide for a continuous monitoring of temperature conditions throughout the environment. This may be accomplished in many ways, one of the more common of which is to position the hot junctions of a plurality of thermocouple sensors at various selected points within the environment, and monitor each of the thermocouple sensors individually. A much more satisfactory system, however, involves the use of what may be called a continuous thermoelectric transducer within the environment to be monitored. Such a transducer typically comprises at least a pair of thermocouple conductors surrounded by a mass of thermistor material, enclosed in a protective metallic sheath. (As used herein, the term "thermistor material" refers to compositions, usually semi-conductive, which exhibit a negative, or inverse, temperature-resistance characteristics). The thermocouple conductors in such a transducer are formed of dissmiliar thermoelectric materials capable of establishing temperature representative thermoelectric voltages when a junction is established therebetween, in accordance with the well-known Seebeck effect. Because of the negative temperature coefficient of resistance of the surrounding thermistor material, a plurality of thermoelectric junctions are established between the thermocouple conductors throughout the length of the transducer. However, inasmuch as these junctions are electrically in parallel, a detector at the cold end of the thermocouple conductors will sense a voltage representative of the highest temperature existing along the length of the transucer. Suitable constructions for such a continuous thermoelectric transducer are disclosed and claimed in U.S. Pat. No. 3,408,607, issued Oct. 29, 1968.

Although a system employing a continuous thermoelectric transducer provides a very satisfactory indication of the highest temperature existing along the transducer within the monitored environment, it is often important to known the precise location of this condition of highest temperature. Moreover, it is often desirable to provide a system which not only continuously monitors the maximum temperature within the environment, but which, when the value of that highest temperature exceeds a preselected minimum value, automatically initiates a determination of the location of the high temperature condition. Such a system is disclosed and claimed in co-pending United States patent application Ser. No. 541,569, filed Apr. 11, 1966 now U.S. Pat. No. 3,493,949 issued Feb. 3, 1970. In that system, as described more fully in the co-pending application, an energy source is adapted to apply energy to the transducer to establish a voltage drop along that portion of one of the thermocouple conductors which lies between the point of application of the energy and the junction whereat the condition of highest temperature exists. The circuit for application of the energy includes, in addition to that portion of the thermocouple conductor, the thermistor material and the outer metallic sheath. The system described in the co-pending application further includes apparatus for measuring that voltage drop and, preferably, for converting the voltage drop to a direct indication of the location of the condition of highest temperature. In general, the circuit for measuring the voltage drop includes the remaining portion of the thermocouple conductor and a third conductor or voltage sensing lead connected thereto.

It has been found that the novel bridge circuit which forms a part of the present invention can be used to great advantage in such a system for measuring and locating temperature conditions. In accordance with the invention, there is provided a balanced dual energy source for applying energy to the transducer. This energy source, which preferably comprises a pair of constant alternating current generators, injects energy into each of the two thermocouple conductors of the transucer, with either the sheath or a third conductor being employed as a common return. In this manner, when a suitable detector is placed in the return leg, it senses a voltage drop representing the difference between the voltage drops along each of the two thermocouple conductors. Thus, since both of the thermocouples exhibit an increased resistance with increased temperature, any error-producing factor due to temperature non-linearity is greatly minimized. Moreover, with proper selection of the thermocouple conductor materials(e.g., chromel and alumel) the difference in resistance of the two thermocouple conductors is nearly constant with respect to temperature and for practical purposes completely eliminates error due to temperature non-linearity. In addition, the use of the balanced bridge circuit for location detection tends to cancel or minimize extraneous signals and sheath noise error is essentially eliminated.

The foregoing and other features of the present invention will be more fully appreciated from a consideration of the remainder of the specification, with illustrative reference to the drawing, in which:

FIG. 1 is a block diagram illustrating one preferred embodiment, constructed in accordance with the invention, of a system for measuring and locating temperature conditions within an environment;

FIG. 2 is a cross-sectional view taken on the line 2—2 in FIG. 1;

FIG. 3 is a schematic diagram illustrating a simplified equivalent circuit for the system of FIG. 1.

DETAILED DESCRIPTION OF EXEMPLARY EMBODIMENT

Figure 4:
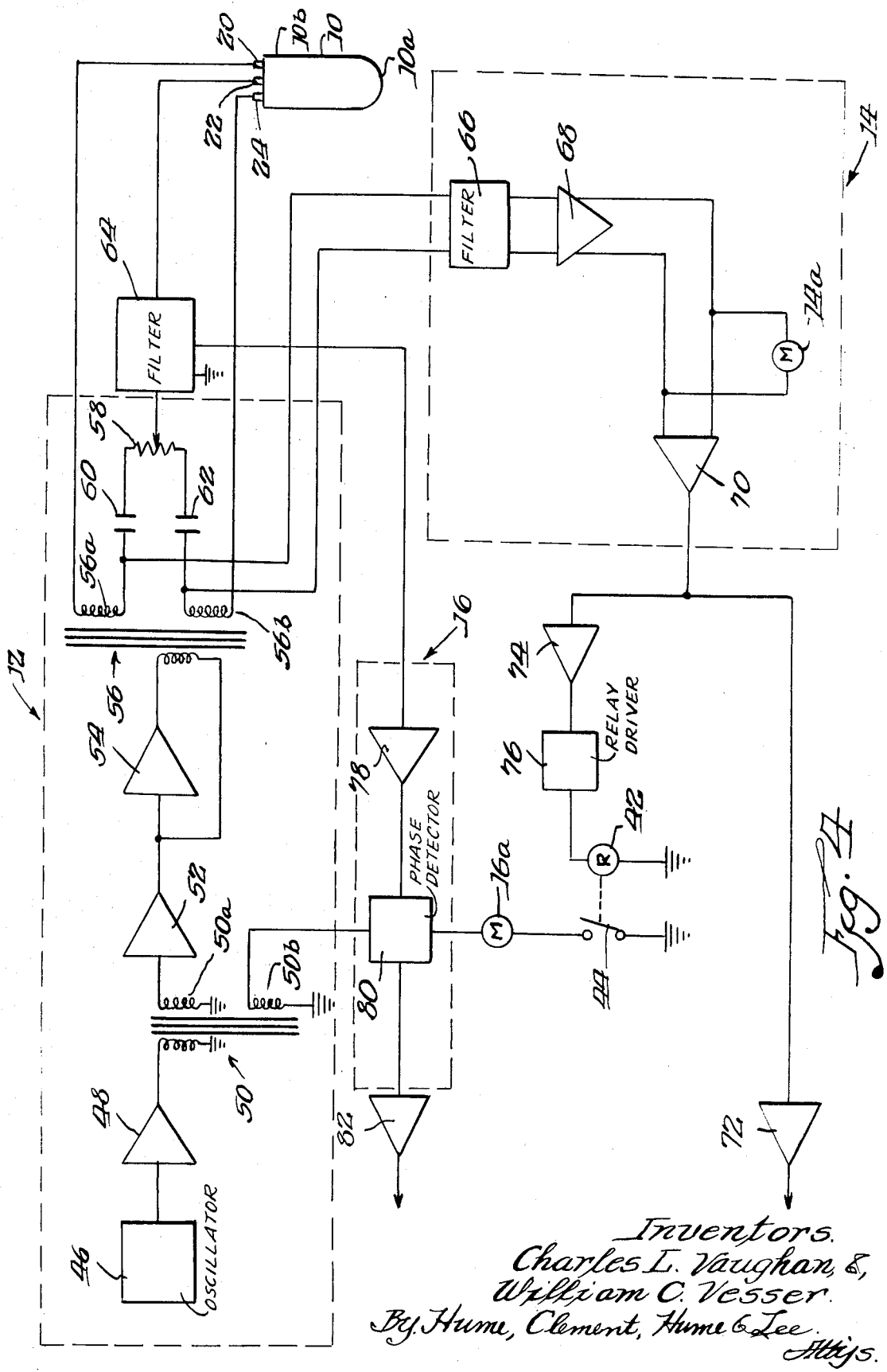
FIG. 4 is a more detailed schematic circuit diagram of the system of FIG. 1.

With reference to the drawing, FIG. 1 illustrates an exemplary embodiment of a system for measuring and locating temperature conditions of interest within an environment. The system includes a thermoelectric transducer 10, an energy source 12, a temperature detector 14, and a location detector 16. As illustrated, the transducer 10, which has a closed end 10a and an open or free end 10b, includes an outer protective sheath 18, preferably formed of a conductive material such as stainless steel. Extending within the transducer 10 are three conductors 20, 22 and 24, which are maintained in spaced relationship by a mass of thermistor material 26. The thermistor material 26 may be of any suitable type which exhibits a negative temperature coefficient of resistance (e.g., a composite of manganese, silicon, lead, aluminum, barium and other minor constituents).

As best seen in FIG. 2, the mass of thermistor material 26 which surrounds and spaces the three conductors 20, 22 and 24, is in turn surrounded by a mass of high temperature insulating material 28 (e.g., magnesium oxide) which fills the void between the thermistor material and the outer sheath 18. Due to the fact that the material 28 is an electrical insulating medium, the sheath 18 is effectively insulated from the conductors 20, 22 and 24 and the thermistor material 26. The conductors 20 and 24 are formed from dissimilar thermoelectric materials (e.g., chromel and alumel), while the conductor 22 may be formed of the same material as either of the conductors 20 and 24, or may be of another suitable conductive substance, such as stainless steel.

Because the conductors 20 and 24 are of dissimilar thermoelectric materials, any junction between them would result in the establishment of a Seebeck voltage having a magnitude which is a function of the temperature at the junction. As can be seen in FIG. 1, there are no contact junctions between the conductors 20 and 24. However, because the thermistor material 26 which surrounds the conductors is semi-conductive in nature, there is in effect an infinite number of parallel electrical junctions across the thermistor material between the conductors 20 and 24. It should be noted that, although numerous thermoelectric voltages will be established between the conductors 20 and 24 due to the continuous nature of the thermistor medium 26, these voltages are in parallel and a sensor connected across the conductors 20 and 24 will therefore sense only the highest voltage.

As can be seen from FIG. 1, the temperature detector 14 is connected across the conductors 20 and 24 by means of conductors 30 and 32 which respectively communicate with conductors 34 and 36. The conductors 34 and 36 also serve to connect the energy source 12 with the thermocouple conductors 20 and 24. The location detector 16 is connected to the energy source 12 by means of a conductor 38, and another conductor 40 connects the location detector with the conductor 22 in the transducer 10.

The system of FIG. 1 generally operates as follows: It may be assumed that the elongated transducer 10 (which, as illustrated, is substantially foreshortened) is disposed within the environment to be monitored. The temperature detector 14 will continuously sense the thermoelectric voltage established as a result of the junction across the thermistor material 26 between the thermocouple conductors 20 and 24 at the hottest point along the length of the transducer 10. A suitably calibrated indicating means is preferably provided in the detector 14 to enable a direct reading of the temperature at this hottest point. When the highest temperature along the transducer 10 reaches a certain preselected minimum reference value, suitable switching means (described below) operate in response to this sensed reference voltage to actuate the energy source 12 and permit it to supply energy to the transducer 10. (It should be understood that this actuation may be accomplished manually or, indeed, the energy source 12 might be always connected to supply energy to the transducer 10). Upon actuation of the energy source 12, which preferably comprises a pair of balanced constant alternating current generators, current is supplied to the transducer 10 through the conductors 34 and 36. As will be described in more detail below, this supply of constant current to the transducer 10 causes the establishment of voltage drops along those portions of the thermocouple conductors 20 and 24 lying between the free end 10b and the junction corresponding to the hottest point along the length of the transducer. The location detector 16, which is connected to the transducer 10 through the conductor 40, serves to measure the difference between (or algebraic sum of) sum of) the respective voltage drops along the conductors 20 and 24. Inasmuch as this voltage drop differential is directly proportional to the length of the conductors along which the voltage drops are established, the location detector 16 can be made to yield a direct indication of the distance between the free ends of the thermocouple conductors 20 and 24 and the junction corresponding to the hottest point along the transducer 10. Thus, the voltage detector 16 provides a direct indication of the location of this hottest point.

The function of the system of FIG. 1 can be better understood by reference to FIG. 3, which illustrates equivalent circuitry for the system of FIG. 1. As shown therein, a resistor $R_{20}$ represents the total resistance of the thermocouple conductor 20 between its free end and the junction corresponding to the point of highest temperature along the transducer 10. Similarly, a resistor $R_{24}$ represents the resistance of the corresponding portion of the thermocouple conductor 24, while a resistor $R_{22}$ represents the resistance of the conductor 22 between its free end and the hot junction. Elements $R_{26}$, $R_{26'}$ and $R_{26''}$ correspond to the impedance of the junctions across the thermistor material 26 between the conductors 20 and 22, the conductors 22 and 24, and the conductors 20 and 24, respectively.

A pair of constant current generators 12a and 12b, which form a part of the energy source 12, are connected (with polarities indicated by +) to supply constant alternating current to the three terminals 10c 10d and 10e of the network which includes the elements $R_{20}$, $R_{22}$, $R_{24}$, $R_{26}$, $R_{26'}$ and $R_{26''}$. Connected between the terminal 10d and the common point between the constant current generators 12a and 12b is a meter 16a which forms a part of the location detector 16. A voltage E is detected across the meter 16a. Connected across the terminals 10c and 10e is a second meter 14a which forms a part of the temperature detector 14. Also connected across the terminals 10c and 10e is a relay coil 42 which is mechanically linked to a switch or set of relay contacts 44 in the circuit leg between the terminal 10d and common point between the constant current generators 12a and 12b.

The meter 14a detects the thermoelectric voltage established as a result of the junction between the thermocouple conductors 20 and 24 across the thermistor material 26 (represented by the equivalent impedance $R_{26''}$) at the hottest point along the transducer 10. (It should be noted that the transducer 10 is represented by the network defined by the three terminals 10c, 10d and 10e). When the thermoelectric voltage sensed by the meter 14a reaches a value corresponding to a preselected minimum or reference temperature, it will be sufficient to actuate the relay coil 42 and close the relay switch 44. Closing of the switch 44 causes the energy source 12, with its dual constant current generators 12a and 12b, to be connected for the supply of constant alternating current to the transducer 10. Thus, current from the current generator 12a will flow (conventionally) through the conductor 36 into the terminal 10c, and through the thermocouple conductor 20 with its equivalent resistance $R_{20}$. This current will leave the thermocouple conductor 20 at the junction corresponding to the point of highest temperature and will pass through the thermistor material 26 to the conductor 22 (across the equivalent impedance $R_{26}$) and exit from the transducer 10 at the terminal 10d, returning to the generator 12a through the meter 16a. Similarly, current from the current generator 12b will pass through the conductor 38, the meter 16a, and the conductor 40 and will enter the transducer 10 at the terminal 10d. This current will then pass through the conductor 22 with its equivalent resistance $R_{22}$, will leave the conductor 22 again at the junction corresponding to the hottest point along the transducer 10, and will pass through the thermistor material 26 (across the equivalent impedance $R_{26'}$) and enter the thermocouple conductor 24, with its equivalent resistance $R_{24}$, finally exiting form the transducer at the terminal 10e and returning to the generator 12b via the conductor 34.

Inasmuch as the energy source 12 is a dual, balanced system, the current supplied by the generators 12a and 12b will be both constant and equal in magnitude. Moreover, the impedance of the thermistor material 26 across the hot junction between the conductors 20 and 22 and between the conductors 22 and 24, respectively represented by the equivalent elements $R_{26}$ and $R_{26'}$, while not necessarily equal, will exhibit a proportionately equal response to differences in temperature. Thus, the meter 16a will sense the voltage E as a function of ($R_{20} - R_{24}$), and because the expression ($R_{20} - R_{24}$) is an essentially linear function of the distance between the input or free end 10b of the transducer and the junction corresponding to the highest temperature, the location of that temperature can be readily determined.

Figure 5:
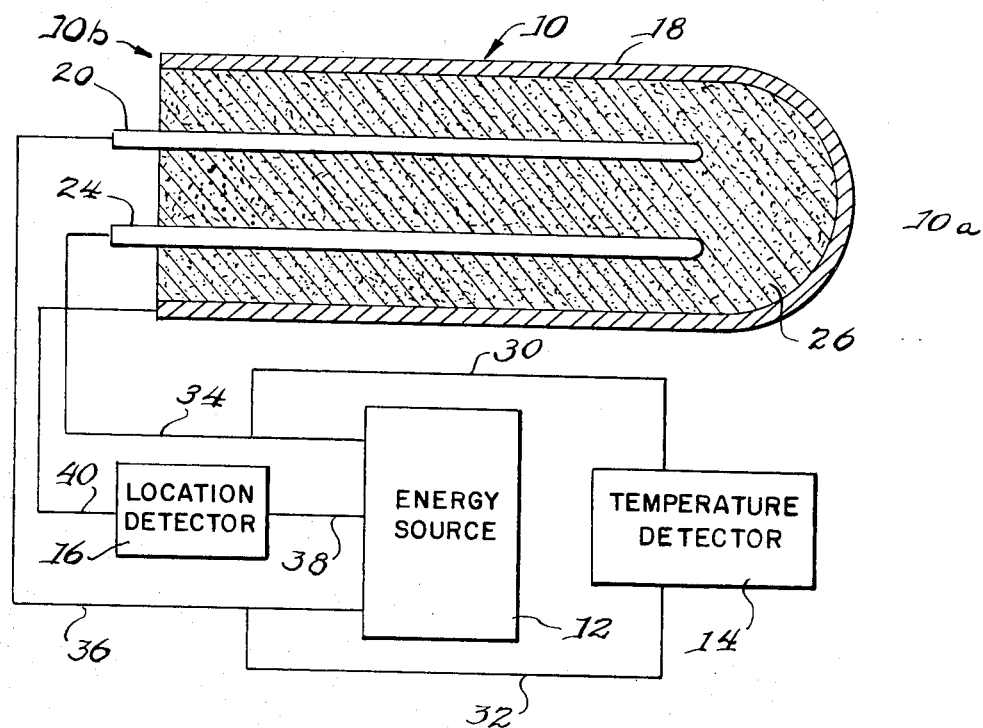
FIG. 5 is a block diagram illustrating an alternative embodiment of the invention.

It should be noted that the temperature detector 14 is preferably characterized by a direct current input with a high immunity to alternating current; while the location detector 16 is preferably characterized by an alternating current input with high immunity to direct current so as to minimize the effects of thermoelectric voltages and possible interactions of functions. It will also be understood that certain modifications could be made to the system of FIGS. 1 and 3 without departing from the essential concept of the invention. These modifications are shown in FIG. 5. For example, the conductor 22 could be dispensed with entirely, and the sheath 18 of the transducer 10 could be employed as the common return between the current generators 12a and 12b. Under such circumstances, the layer of electrical insulating material 28 within the transducer 10 would be dispensed with, permitting junctions between the conductors 20 and 24 and the sheath 18 across the thermistor material 26. When operated in this manner, the system of FIG. 5 would still retain the advantages of temperature linearity and suppression of extraneous signals due to the balanced bridge circuitry employed.

Turning now to FIG. 4, there is illustrated a more detailed schematic representation of the system of FIG. 1. The circuit illustrated in FIG. 4 contains the same essential circuit elements as that of FIG. 1, namely, the transducer 10, an energy source circuit generally designated by the numeral 12, a temperature detector circuit generally indicated by the numeral 14 and a location detector circuit indicated by the numeral 16. The energy supply circuit 12 includes a conventional bridged-tee oscillator 46 which drives a conventional Class AB amplifier 48. The amplifier 48 is loaded by a transformer 50 whose secondary windings 50a and 50b communicate respectively with the remainder of the energy source circuitry 12 and the location detector circuitry 16. Specifically, the winding 50a is connected to a conventional power amplifier 52 which drives a constant current amplifier 54. The amplifier 54 is loaded by a second transformer 56 whose secondary windings 56a and 56b are equal. One side of the winding 56a is connected to the thermocouple conductor 20 of the transducer 10, while one side of the winding 56b is connected to the thermocouple conductor 24. The other sides of the windings 56a and 56b communicate with an adjustable potentiometer 58 through capacitors 60 and 62 respectively.

The drop lead of the potentiometer 58 is connected to a conventional high-pass filter 64 which serves to suppress thermoelectric signals from the transducer 10. The filter 64 also communicates with the conductor 22 of the transducer 10 and with the location detector circuitry 16. The potentiometer 58 is used as a null balance for calibrating the location detector 16, as will be hereinafter described.

The temperature detector circuit 14 includes a conventional low-pass filter 66 which is connected across the thermocouple conductors 20 and 24 through the secondary windings 56a and 56b respectively. The filter 66 serves to suppress alternating currents from the location detector circuitry 16, and from other sources. Connected to the filter 66 is a balanced, high input impedance amplifier 68 with internally adjustable gain for cold junction compensation. Connected across the output of the amplifier 68 is the meter 14a, which serves to sense the thermoelectric voltages generated in the transducer 10. The output of the amplifier 68 also drives a conventional operational amplifier 70 whose output may be directed to an isolation amplifier 72 which can be used for driving ancillary recording or display equipment as an alternative or complement to the meter 14a. In addition, the output of the amplifier 70 communicates with a level detection amplifier 74 which in turn feeds a relay driver 76. The relay driver 76 provides energization for the relay coil 42. Thus, when the thermoelectric voltage sensed by the meter 14a reaches a certain level corresponding to a preselected reference temperature, the elements 74 and 76 cause energization of the relay coil 42 and consequent closing of the mechanically linked relay contacts or switch 44 in the location detector circuit 16.

The location detector circuit 16 receives input from the conductor 22 of the transducer 10 via the high-pass filter 64. This input is directed to a conventional operational amplifier 78 having adjustable gain, and is in turn fed to a conventional full-wave double-bridge phase detector 80. The phase detector 80 receives a phase reference signal from the secondary winding 50b of the transformer 50 which comprises a part of the energy source circuitry 12. The rectified output from the phase detector 80 is fed both to the meter 16a and to a conventional operational amplifier 82 which, like the amplifier 72, may be used to drive ancillary recording or display devices. Thus, when the relay switch 44 is closed in response to a preselected reference or minimum temperature sensed by the temperature detector circuitry 14, this actuates the meter 16a, which displays the amplified resultant difference between the voltage drops along the thermocouple conductors 20 and 24.

In order to calibrate the meter 16a for an indication of the location of the highest temperature along the transducer, heat is applied to the free end 10b of the transducer and the potentiometer 58 is adjusted until the meter 16a reads minimum. Heat is then applied to the other end 10a of the transducer 10 and the deflection of the meter 16a is equated to the total length of the transducer. (Full scale deflection of the meter 16a for the total length of the transducer 10 may be obtained by adjustment of the gain of the amplifier 78). The meter 14a may be calibrated for direct temperature measurement by applying known temperatures to the transducer 10.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

We claim:

1. A method of sensing and locating a maximum temperature condition of interest existing within an environment, comprising:
   a. disposing a thermoelectric transducer within said environment, said transducer comprising at least a pair of conductors formed of dissimilar thermoelectric materials and completely surrounded by a mass of thermistor material;
   b. sensing the thermoelectric signal generated as a result of the junction between said conductors across said thermistor material at the point of highest temperature along said transducer;
   c. applying energy to said transducer to establish voltage drops along each of those portions of said conductors lying between the point of application of said energy and said junction;
   d. measuring the difference between each of said voltage drops; and
   e. translating said measurement into an indication of the location of said junction.

2. A method in accordance with claim 1, including the step of translating said thermoelectric signal into an indication of the magnitude of said highest temperature.

3. A method in accordance with claim 1, including the steps of:
   a. preselecting a minimum temperature value; and
   b. initiating said application of energy to said transducer upon the sensing of a thermoelectric signal indicative of a value for said highest temperature in excess of said preselected minimum value.

4. A method in accordance with claim 1, wherein said energy is applied to said transducer through a circuit which includes said portions of said conductors, said thermistor material, and a conductive sheath for said transducer.

5. A method in accordance with claim 1, wherein said energy is applied to said transducer through a circuit which includes said portions of said conductors, said thermistor material, and a third conductor embedded in said thermistor material.

6. Apparatus for sensing and locating temperature conditions within an environment comprising:
   a. an elongated thermoelectric transducer including a pair of thermocouple conductors, a mass of thermistor material completely surrounding said thermocouple conductors, and an outer metallic sheath;
   b. first means connected to said thermocouple conductors for sensing the thermoelectric signal generated as a result of the junction between said thermocouple conductors across said thermistor material at the point of highest temperature along said transducer;
   c. second means for applying energy to said transducer to establish voltage drops along each of those portions of said thermocouple conductors lying between the point of application of said energy and said junction; and
   d. third means for measuring the difference between each of said voltage drops.

7. Apparatus in accordance with claim 6, wherein said first means includes indicating means calibrated to translate said signal into an indication of the magnitude of said highest temperature.

8. Apparatus in accordance with claim 6, wherein said third means includes indicating means calibrated to translate said difference between said voltage drops into an indication of the location of said highest temperature.

9. Apparatus in accordance with claim 6, including automatic switch means operable in response to said signal to connect said second means to said transducer when the value of said signal indicates a temperature in excess of a preselected value.

10. Apparatus in accordance with claim 6, wherein said second means is connected to said transducer to apply energy thereto through a circuit including said sheath, said thermistor material, and said portions of said thermocouple conductors.

11. Apparatus in accordance with claim 10, wherein said second means includes a pair of balanced constant current generators, one connected to supply current to one of said thermocouple conductors and the other connected to supply current to the other of said thermocouple conductors, with said sheath serving as a common return to said generators.

12. Apparatus in accordance with claim 6, wherein said second means is connected to said transducer to supply energy thereto through a circuit including said portions of said thermocouple conductors, said thermistor material and a third conductor.

13. Apparatus in accordance with claim 12, wherein said sheath is electrically insulated from all of said conductors and from said thermistor material.

14. Apparatus in accordance with claim 13, wherein said second means includes a pair of balanced constant current generators, one connected to supply current to one of said thermocouple conductors and the other connected to supply current to the other of said thermocouple conductors, with said third conductor serving as a common return to said generators.

* * * * *